Dec. 26, 1944. C. A. DIES 2,366,010
PIPE COUPLING
Filed Dec. 20, 1943
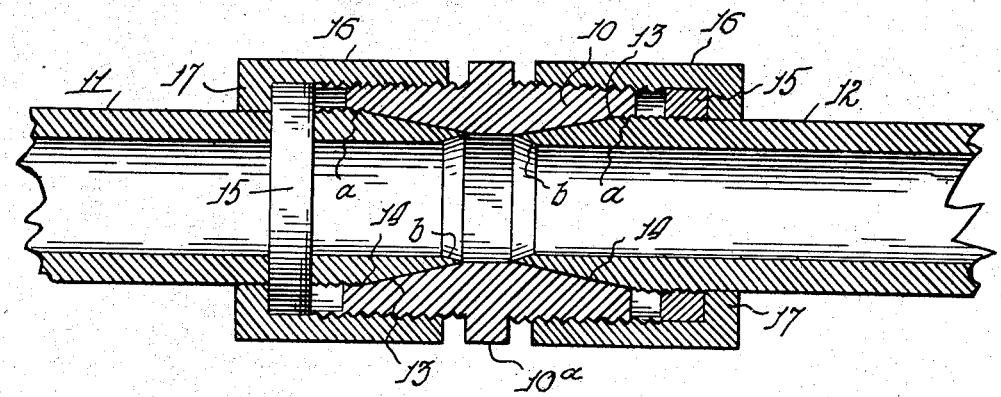
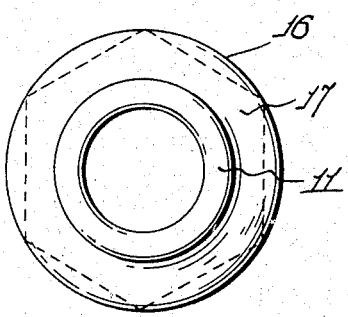
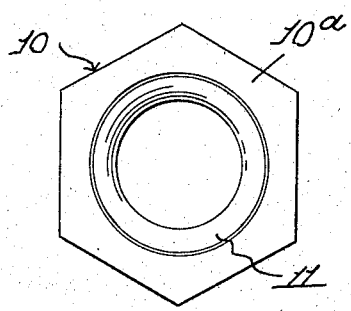
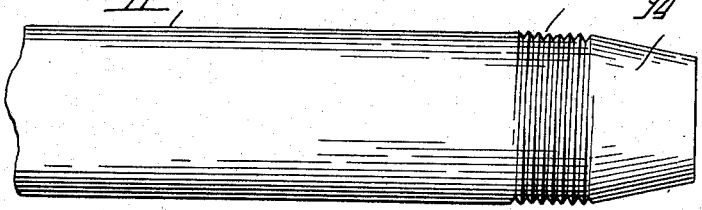
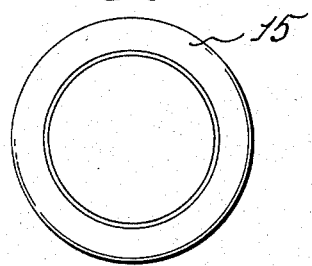
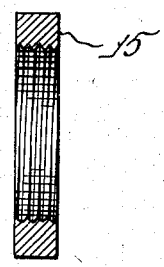
Inventor:-
Charles A. Dies.
By Horace Neal
Attorney Patented Dec. 26, 1944

2,366,010

UNITED STATES PATENT OFFICE 2,366,010

PIPE COUPLING

Charles A. Dies, Chicago, Ill., assignor of one-half to Oscar W. Pederson, Aurora, Ill.

Application December 20, 1943, Serial No. 514,965

4 Claims. (Cl. 285—122)

My invention relates to pipe couplings of that particular type in which the tapered end of the pipe is forced into intimate engagement with a correspondingly tapered opening in the coupling member by means of a flanged nut or sleeve and cooperating ring, and in this instance involves certain improvements in respect to that particular form of pipe coupling disclosed in my prior Patent No. 2,347,469, dated April 25, 1944.

The primary object of my present invention, therefore, is to simplify the construction with reference to the manner of connecting the tapered end of the pipe to the coupling member so as to obviate the employment of a special form of expansible ring and groove in the pipe with which it engages, yet maintaining intimate contact between the pipe and coupling member at the opposite ends of the tapered portion of the pipe—for use in association with pipe lines conducting high pressure steam, either in connecting pipes (as illustrated in the accompanying drawing), or for connecting pipes to plumbing fixtures or fittings.

In this instance the desired engagement of the tapered end of the pipe with the coupling member is effected by threading a definite portion of the pipe at the inner end of the tapered portion thereof for threaded engagement of a ring with which the flanged nut engages for clamping the parts together; whereby—as in my former construction—the inner end of the tapered portion of the pipe is firmly and intimately connected to the outer end of the tapered opening in the coupling member while the inner end of said tapered portion of the pipe intimately engages the inner end of the opening—the connection between the ring and pipe being by means of left hand threads for a more effective clamping operation in the coupling of the parts.

My present invention therefore consists in the specific construction and arrangement of elements constituting my improved form of pipe coupling, as hereinafter more fully described and set forth in the appended claims.

In the drawing:

Fig. 1 is a longitudinal sectional view of the pipe coupling constructed in accordance with my invention.

Fig. 2 is an end view of the coupling, including the several assembled parts constituting the same.

Fig. 3 is a detail end view of the coupling member.

Fig. 4 is a detail view of the pipe to illustrate the formation of the tapered end portion thereof, including the part that is threaded for engagement of the ring against which the flanged nut is clamped, and Figs. 5 and 6 are detail views of the ring.

In the form of coupling which I have illustrated in the drawing, showing its application to one type of pipe coupling, the numeral 10 designates the coupling member to which pipes 11, 12 are connected at the opposite ends thereof for the purpose of joining two lengths of pipe on a line with each other, it being understood, of course, that the improved means of connection or coupling, hereinafter described, may be employed in association with elbow couplings, valves, etc.—the opening, 13, at opposite ends of the aforementioned coupling member being tapered or contracted inwardly to receive the correspondingly tapered ends of the pipes, and for convenience in holding the coupling member during the operation of connecting the pipes thereto said coupling member is enlarged centrally, at 10$^a$, of hexagonal shape to receive a wrench.

In carrying out this invention the pipe—to be connected to the coupling member—is not only provided with a plain tapered end, 14, but is also threaded for a definite portion thereof beginning at the inner end of the tapered portion and extending therefrom a predetermined distance to receive a collar or ring 15 threaded thereon to form an abutment against which the flanged nut or sleeve 16 impinges in clamping the parts together.

The thickness of the collar 15 corresponds approximately with the depth of the flange 17 at the outer end of the nut or sleeve 16, the said flange embracing the pipe beyond the threaded portion of the latter so as to engage the collar in the operation of coupling the parts—the spacing of the collar from the tapered end portion of the pipe being such as to permit that part of the thread, $a$, at the inner end of said tapered portion to firmly engage the coupling member at the outer end of the opening, either by cutting a thread therein or providing the coupling member with a short thread for the purpose. It will be obvious from Fig. 1 of the drawing this arrangement provides that when the parts are assembled the flanged nut in engagement with the collar—or impinging thereagainst—will force the pipe, on which the collar is fixed, into the tapered opening in the coupling member by a turning movement.

In order to augment the threaded engagement of the pipe with the outer end of the tapered opening in the coupling member—in providing a seal tight joint—the outer end of the bore in the pipe is countersunk or beveled, designated by $b$, to not only form a more intimate contact with the tapered opening but also permit free passage of high pressure steam or other fluid conducted by the connected pipes—provision of the bevel being more effective than having the outer end of the taper coincide with the bore in the pipe; that is, the end of the pipe is not only stronger but the pressure of the fluid against the beveled surface tends to force the pipe into intimate contact with the wall of the opening at this point to prevent leakage. By this arrangement—thread connection and bevel—the pipe will be firmly connected to the coupling member to withstand longitudinal stress as well as form a seal tight joint.

As hereinbefore suggested I may have the tapered opening in the coupling member plain throughout its length and rely on the turning of the flanged nut, or the pipe itself, to cut a short thread in the outer end of said opening instead of forming the coupling with a short thread at this point, but in either instance I prefer that the threaded portion of the pipe and thread in the collar or ring be left hand threads, so that the turning of the flanged nut bearing against the ring will not disturb the position of the latter on the pipe; that is, the collar or ring is threaded on the pipe to the inner end of the left hand thread, $a$, and as the flanged nut is connected to the coupling member by conventional right hand threads the turning of the same—in coupling the pipes—will have a tendency to tighten the collar away from the coupling member instead of towards it.

From the foregoing description, in connection with the accompanying drawing, it will be apparent that my improved construction and arrangement of parts provide a simple and effective means for connecting pipes to each other or to valves, etc., in a manner that will facilitate the operation as well as establish a strong leak proof joint.

I claim:

1. Means for connecting pipes to couplings, valves, and other plumbing fixtures, comprising a coupling member having an inwardly tapered plain opening at its outer end, in association with a pipe tapered at its end to correspond with the tapered opening in the coupling member and threaded circumferentially into and for a short distance from the inner or upper end of the tapered portion, an abutment on the pipe, and an internally flanged nut or sleeve threaded on the coupling member with the flange in engagement with the abutment to force the tapered end of the pipe into the tapered opening in the coupling member by a turning motion and to threadedly engage the outer end of said tapered opening by cutting a thread therein.

2. Means for connecting pipes to couplings, valves, and other plumbing fixtures, comprising a coupling member having an inwardly tapered plain opening at its outer end, in association with a pipe tapered at its end to intimately engage the tapered opening in the coupling member, said pipe being threaded circumferentially into and for a short distance from the inner end of the tapered portion thereof, a ring internally threaded to engage the thread on the pipe and form an abutment—left hand threads forming the connection between the ring and pipe—and an internally flanged nut on the coupling member in threaded engagement with the outer end thereof; the connection between the flanged nut and coupling member being by right hand threads, whereby the turning of the nut against the ring will not move it towards the coupling member and the turning of the pipe will cut a short thread in the outer end of the opening in the coupling member to provide a seal tight connection at this point.

3. Means for connecting pipes to couplings, valves and other plumbing fixtures, comprising a coupling member having a plain opening therein tapered at its outer end portion, in association with a pipe tapered at its end to correspond with the tapered opening in the coupling member and threaded circumferentially into and from the inner end of the tapered portion, a ring internally threaded to engage the thread on the pipe and form an abutment, the bore of the pipe being countersunk or beveled at the outer thinner end of the tapered portion, and an internally flanged nut threaded on the coupling member with the flange in engagement with the ring to turn the pipe to cut a thread in the upper end of the tapered opening in the coupling for threaded engagement of the pipe and coupling member at this point, whereby the opposite ends of the tapered portion of the pipe intimately engage the tapered opening in the coupling member to provide a seal tight coupling for conducting high pressure fluids.

4. Means for connecting pipes to couplings, valves, and other plumbing fixtures, comprising a coupling member having a plain opening therein tapered at its outer end portion inwardly, in association with a pipe tapered at its end to correspond with the tapered opening in the coupling member and threaded circumferentially rearwardly from the inner end of the tapered portion, said thread extending into the upper end of the tapered portion of the pipe, a ring internally threaded to engage the thread on the pipe and form an abutment—left hand threads forming the connection between the ring and pipe—and an internally flanged nut threaded on the coupling member by right hand threads to impinge against the ring, whereby the turning of the nut on the coupling member against the ring will not move it towards the end of the coupling member but have a tendency to force the end of the pipe into the opening by a turning movement to engage the thread with the outer end of the opening in the coupling member and cut a thread in the same for more intimate engagement therewith.

CHARLES A. DIES.